May 28, 1968     J. A. REDMOND     3,385,948

SEAM WELDING METHOD

Filed Jan. 13, 1965

INVENTOR
John A. Redmond
BY

United States Patent Office 3,385,948
Patented May 28, 1968

3,385,948
SEAM WELDING METHOD
John A. Redmond, Ellicott City, Md., assignor to Westinghouse Electric Corporation, East Pittsburgh, Pa., a corporation of Pennsylvania
Filed Jan. 13, 1965, Ser. No. 425,174
6 Claims. (Cl. 219—106)

The present invention relates to a seam welding method, and more particulary to electrical resistance seam welding.

In resistance welding involving the use of a consumable welding rod it has been the practice to melt the tip of the welding rod and local regions of the proximate metal members to be welded together by heating with an electric arc which is established between such members and either the tip of the consumable welding rod, which then acts as a consumable electrode, or the tip of an electrode which is separate from the consumable welding rod. The localized molten welding zone thus created is caused to progress along a seam by causing the proximate edges of the metal members to be scanned by the arc and the consumable welding rod, usually in the presence of a flux and/or an inert gas which act to enhance the formation of a suitable weld. This method, known as arc welding finds considerable use and is highly successful in many applications. It does, however, require considerable skill when performed manually, and, when performed by automated equipment it necessitates considerable sophistication of such equipment.

In view of the foregoing remarks it becomes a prime object of the present invention to provide an electrical method of welding a seam between two proximate edges of a metal member or members by the melting of a consumable welding rod in a manner which obviates need for establishing and maintaining an arc to perform the heating.

The above object is obtained, in accord with general features of the present invention, by arrangement of the metal edges in spaced-apart adjacent relationship to form a gap therebetween, bridging the gap at an intended weld origin site by the tip of a welding rod, causing alternating current to flow along the gap edges via the welding rod tip in a manner which preheats such edges and causes localized melting thereof and of the welding rod in the immediate vicinity of such tip to form a weld, and effecting scansion of the welding rod along the gap in the direction of the preheated edges while maintaining such current flow and gap-bridging contact of the melting tip at the leading edge of the weld being formed therebehind.

Other objects, advantages, and features of the invention will become apparent from the following description when taken in connection with the accompanying drawing, in which.

Figure 1:
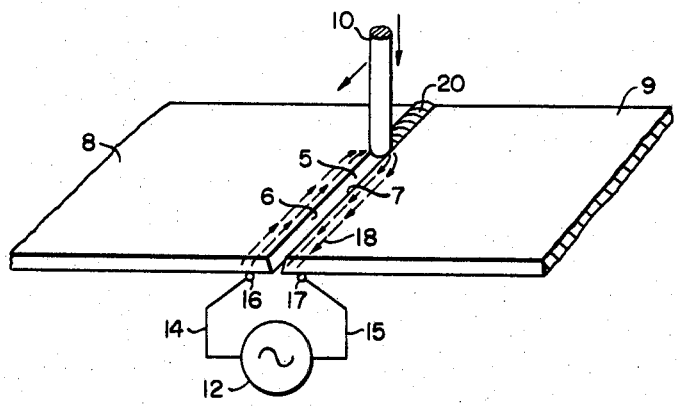
FIGURE 1 is a schematic representation of edges of a metallic member or members being butt welded in accord with the method of the present invention.

Referring to FIG. 1, in accord with the welding method of the present invention there are arranged, in adjacent slightly spaced-apart relationship so as to form a narrow gap 5 therebetween, two edges 6 and 7 of plate-like metal workpiece members 8 and 9 which are to be joined by butt welding at such edges. The tip of a welding rod 10 is brought into contact with both members 8 and 9 so as to bridge the gap 5 at a location therealong which is desired to be the origin of a seam weld; usually at one end of such gap. Opposite terminals of an alternating current source 12 of suitable frequency are then connected to the metal members 8 and 9, respectively, via leads 14 and 15 and contacts 16 and 17, per the symbolic showing in FIG. 1, at a location in advance of the welding rod 10. Current is thereby caused to flow instantaneously in opposite directions between contacts 16 and 17 along a path indicated by arrows 18 at the edges 6 and 7 of members 8 and 9 via the tip of the welding rod 10. By virtue of the "proximity effect" due to the adjacent instantaneously counterflowing currents as taught in U.S. Patents 2,066,668 and 2,400,921 to Bennett and Dow et al., respectively, enhanced by high frequency "skin effect," the current will flow along the edges 6 and 7 to a limited effective depth to preheat same and will become concentrated in the immediate vicinity of and including the welding rod tip to cause localized melting of members 8 and 9 and of such tip to start a weld. The welding rod 10 is then advanced along the gap 5, or vice versa, while feeding it toward such gap to maintain it in contact with members 8 and 9 while bridging such gap at the front of the seam weld 20 which is formed progressively in extension behind such rod. By suitable choice of frequency, current, and gap width selected in accord with the particular metal and thickness of members 8 and 9, the seam weld 20 may be produced at relatively high rates without dependence upon arc heating of the rod and workpiece members.

Figure 2:
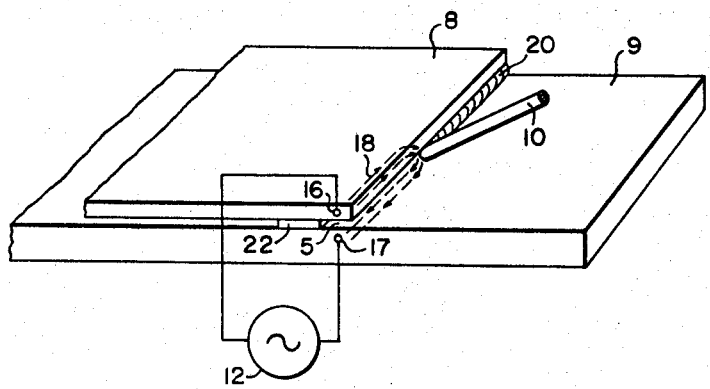
FIG. 2 is a representation similar to that in FIG. 1 showing the invention as it would be employed for welding one edge of a metal member to a face of a second metal member.

Welding of one plate-like metal workpiece member 8 to the surface of a similar member 9 in overlapping fashion may be accomplished in manner shown in FIG. 2 by providing a spacer member 22 to assist in defining the gap 5 which will lie between two flat extended faces of the workpiece members, rather than between edges thereof as in the FIG. 1 arrangement. The welding rod 10 will then be advanced in a slanted attitude along the gap while its tip is progressively melted by the concentrated currents flowing through its tip to produce the seam weld 20 along the proximate portions of the workpiece members 8 and 9, preheated by current flow from the source 12 via the contacts 16 and 17 which are positioned in advance of the welding rod tip.

Figure 3:
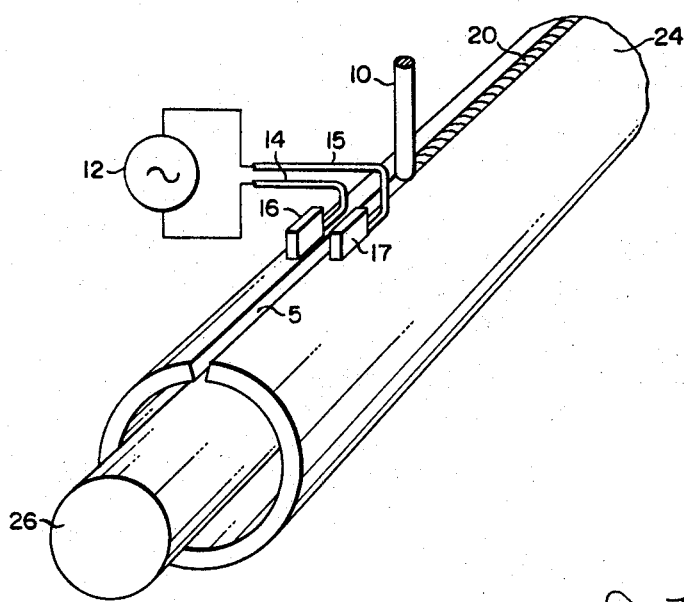
FIG. 3 is a schematic representation of edges of a single metallic member being welded into a cylinder shape in accord with the method of the present invention.

In the butt welding together of two edges of the same member, as in tube seam welding, the cylindrical workpiece member 24, FIG. 3, will be formed to have edges thereof in spaced-apart proximity at opposite sides of the gap 5 along which the weld 20 is to progress. Where the axial length of the member may be relatively short, it will be feasible for the gap edges to be parallel and for the contacts 16 and 17 to be at a fixed location. Where such length may be relatively great, the formation of the cylindrical shape may be done progressively and the gap 5 may be V-shaped and/or the contacts 16 and 17 be arranged to slide along surfaces of member 24 near and at opposite sides of such gap in advance of the welding rod tip. Where necessary to prevent waste flow of current between the contacts 16 and 17 via a circumferential route in member 24, a core member 26 of suitable well-known material and construction can be employed in disposition within member 24.

While there have been shown and described illustrative embodiments of the invention, modifications thereof may readily occur to those skilled in the art, such, for example, as regulating the voltage applied to the contacts to compensate for a variable heating effect tending to result from a varying welding rod-to-contact distance, as in FIGS. 1 and 2 embodiments where the contacts are at a fixed location, causing the current flow by use of induction coil means, rather than the contacts as illustrated, or using the technique for soldering where the welding rod would be a solder rod and the preheated edges would not become molten in the region of the rod tip as in the case of welding; etc. It is desired, therefore, that the appended claims cover all such modifications as fall within the true spirit and scope of the invention.

I claim:

1. A method of forming a seam between two workpiece surfaces of electrically-conductive resistance-heatable material, comprising the steps of arranging such surfaces so as to be initially spaced-apart to form a gap therebetween in extension to a desired joining point, electrically bridging the gap between such surfaces with the tip of an electrically-conductive resistance-heatable rod at such point, and causing high frequency current to flow along the gap edges in respective instantaneously opposite directions via the rod tip to preheat such edges and cause melting of the rod in the immediate vicinity of such tip to form a bond between edges at such location.

2. The welding method of claim 1, wherein the rod is caused to scan along the gap during such flow of current and while its tip becomes progressively melted away to form a continuous scan bond therebehind.

3. The method of claim 1, wherein the high frequency current is fed to the workpiece edges by way of electrical contacts at respective positions at opposite sides of the gap and in advance of the joining point.

4. The method of claim 2, wherein the high frequency current is introduced to the workpiece edges by sliding contacts which are caused to scan lengthwise of the gap in unison with the aforesaid rod.

5. A method of welding a seam between two workpiece edge portions internally heatable by flow of current therethrough, comprising the steps of placing such edge portions in spaced-apart adjacent relationship, and causing a high frequency electrical current to flow in instantaneously opposite directions along such edge portions and across the gap therebetween via the tip of a consumable welding rod being scanned along such gap, so that the edge portions become preheated in advance of the welding rod tip and locally melted simultaneously with such tip to form a weld seam extending between such edge portions in extension behind such rod.

6. The seam welding method of claim 5, wherein the high frequency currents are introduced to the workpiece edges via sliding contacts which are caused to scan lengthwise of the gap.

References Cited

UNITED STATES PATENTS

| | | | |
|---|---|---|---|
| 1,312,039 | 8/1919 | Meilink | 219—83 |
| 1,674,109 | 6/1928 | Grob | 219—67 |
| 2,005,912 | 6/1935 | Drake | 219—67 |
| 2,281,805 | 5/1942 | Schenk | 219—106 |
| 3,288,982 | 11/1966 | Suzuki et al. | 219—137 |
| 2,066,668 | 1/1937 | Bennett | 219—67 |

RICHARD M. WOOD, *Primary Examiner.*

C. CHADD, *Assistant Examiner.*